United States Patent

Vida

[15] 3,676,454
[45] July 11, 1972

[54] ACYLOXYMETHYL DERIVATIVES OF DIPHENYLHYDANTOIN

[72] Inventor: Julius A. Vida, Boston, Mass.

[73] Assignee: The Kendall Company, Boston, Mass.

[22] Filed: Aug. 31, 1970

[21] Appl. No.: 68,471

Related U.S. Application Data

[62] Division of Ser. No. 749,973, Aug. 5, 1968, Pat. No. 3,595,862.

[52] U.S. Cl. ......................................................260/309.5
[51] Int. Cl. .....................................................C07d 49/32
[58] Field of Search.............................................260/309.5

[56] References Cited

UNITED STATES PATENTS

| | | |
|---|---|---|
| 2,928,841 | 3/1960 | McConnell et al. .................260/309.5 |
| 3,213,104 | 10/1965 | Cashin et al. ........................260/309.5 |

OTHER PUBLICATIONS

Asahi Chemical Industry Chem. Abst. Vol. 65, column 723 (1966). QD1.A51 (Abstract of Japanese patent 4709('66)).
Chemical Abstracts Vol. 70 Subject Index, A– J January–June, 1969, page 1567S (1970). QD1.A51
Mitsubishi Chemical Industries Chem. Abst. Vol. 60, column 2946 (1964). QD1.A51 (Abstract of Japanese patent 19,986('63)).
Schloegl et al. Chem. Abst. Vol. 56, Columns 7299– 7302 (1962). QD1.A51
Zejc Chem. Abst. Vol. 70, No. 37780a (1969). QD1.A51

*Primary Examiner*—Natalie Trousof
*Attorney*—R. W. Furlong

[57] ABSTRACT

N,N'-Bis(acyloxymethyl) phenobarbital, N,N'-Bis(acyloxymethyl)barbital, 3-acyloxymethyl diphenylhydantoin, and N,N'-diacyloxy diphenylhydantoin compounds are described as well as therapeutic compositions containing them and their use as anticonvulsant agents.

5 Claims, No Drawings

ACYLOXYMETHYL DERIVATIVES OF DIPHENYLHYDANTOIN

This application is a division of Ser. No. 749,973, filed August 5, 1968, now U.S. Pat. No. 3,595,862.

This invention relates to new chemical compounds and to the use of these compounds as anticonvulsant agents for treating convulsions and seizures in warm blooded animals.

Phenobarbital and diphenylhydantoin have both long been known to be useful as anticonvulsant agents in warm blooded animals, having been employed in the treatment of epilepsy; however, phenobarbital suffers from the disadvantage that it exhibits hypnotic activity as well as anticonvulsant activity, while diphenylhydantoin has the disadvantage that although not hypnotic, it does have a multiplicity of undesirable side effects, for example, hypertrophic gingivitis, megaloblastic anemia, toxic psychoses, and hirsutism. It has now been found that N,N'-bis(acyloxymethyl) phenobarbital, N,N'-bis(acyloxymethyl) barbital, 3-acyloxymethyl diphenylhydantoin, and N,N'-bis(acyloxymethyl) 5,5-diphenylhydantoin are effective anticonvulsants which possess unexpected advantages from the pharmacological standpoint over their respective parent compounds.

The compounds of the present invention include those in which the acyloxy groups include acetoxy, acryloyloxy, methacryloylexy, propionoxy, and benzoyloxy. The compounds in which the acyloxy groups are acetoxy are preferred; N,N'-bis(acetoxymethyl) phenobarbital, and 3-acetoxymethyl diphenylhydantoin are particularly preferred.

The compounds may be made by reacting phenobarbital sodium or 5,5-diphenylhydantoin sodium with chloromethyl methyl ether in a suitable diluent such as dimethyl formamide over a wide range of temperatures, conveniently from below 0° C. up to the boiling point of the solvent to form the appropriate N-methoxymethyl or N,N'-bis(methoxymethyl) compounds; these compounds are then reacted with the appropriate acid anhydride in the presence of a base such as pyridine or a catalyst such as stannic chloride. The methoxymethyl compounds may also be made by reacting barbital, phenobarbital or 5,5-diphenylhydantoin in methanol or dioxane with formaldehyde in the presence of an acid such as hydrochloric acid.

The compounds of the invention may be formulated with conventional physiologically acceptable vehicles and carriers to make syrups, isotonic solutions, tablets, and other dosage forms. Toxicity and effectiveness of the compounds are such that each dosage unit may contain from 10 to 500 mg of active material.

The procedures employed for demonstrating efficacy of the compounds as set forth in the following examples were as follows.

All tests, with the exceptions noted, were conducted on adult albino male mice (Charles River strain); the dosage consisted of the active agent suspended in 10 percent aqueous acacia and was administered orally unless otherwise indicated.

Acute oral toxicity and acute intraperitoneal toxicity were determined in the conventional manner. The results were expressed as $LD_{50}$, the dose required to produce death in 50 percent of the animals treated, determined graphically, with the 95 percent limits shown in parentheses.

The dosage required to produce a neurological deficit was determined by the method of Swinyard et al., J. Pharmocol. Exptl. Therap. 106, 319 (1952) except that one additional test was employed: the ability of the animal to remain for at least 1 minute on a "rotorod", a horizontal rod rotated at 6 r.p.m. The results were expressed at $TD_{50}$, the dose required to produce the effect, determined graphically, with 95 percent limits.

The time of peak anticonvulsant activity was determined by administering dosages of various sizes to a group of animals and administering a maximal electroshock to the animals at intervals thereafter by supplying 60 ma. current through a corneal electrode for 0.2 second. Protection was indicated if the animal failed to show the tonic extensor component of the maximal electroshock seizure pattern in unprotected animals. The time of peak effect thus determined was used for all subsequent tests of anticonvulsant activity on the same active agent.

Anticonvulsant effectiveness of each agent was determined against maximal electroshock administered as described above, against a convulsive dose of Metrazol (106.25 mg/kg.) injected subcutaneously, and against a lethal dose of strychnine sulfate (1.5 mg/kg.) injected subcutaneously. In the case of maximal electroshock the criterion for effectiveness was failure to show the tonic extensor component of the seizure pattern; in the case of Metrazol, the failure to show clonic convulsive seizures; and in the case of strychnine sulfate the failure to die, even though seizures appeared.

Hypnotic activity or depression of the central nervous system as indicated by loss of the righting reflex (onset of sleep) was either absent or very weak in the case of any dosage of any of the compounds of the present invention less than a lethal dose. Phenobarbital itself on the other hand did exhibit potent hypnotic activity using the foregoing criterion, as is well known.

The following specific examples are intended to illustrate more fully the nature of the present invention without acting as a limitation on its scope.

EXAMPLE 1

In a 500 ml flask equipped with a stirrer and condenser, 11.5 g. (0.05 mole) of phenobarbital was dissolved in a mixture of 20 ml dioxane and 100 ml of 37 percent aqueous formaldehyde solution. To the solution 1 ml of 38 percent hydrochloric acid was added and the solution was heated at a reflux for 16 hours. The solution was cooled to room temperature and the product was extracted into ethylacetate. The combined organic layer was washed with water, dried over sodium sulfate, then evaporated to dryness. To the oily residue 12.5 ml of acetic anhydride and 12.5 ml of pyridine were added and the solution was allowed to stand at room temperature overnight. The solution was poured into 500 ml cold water containing 12.5 ml of 38 percent hydrochloric acid and was stirred for three hours. The crude product in the form of a solid precipitate was filtered and washed with water, then dissolved by heating in 100 ml of ethanol. To the hot solution 1 g of activated carbon was added and the boiling solution was filtered through a Buchner funnel containing a 1 cm layer of finely divided diatomaceous silica. The cake was washed three times with 15 ml of ethanol and the hot solution together with the washings was allowed to cool to room temperature. The resulting crystals after filtering, washing three times with 20 ml of ethanol, and drying in a vacuum desiccator, weighed 10.1 g (53 percent yield) m.p. 136°–137°. Further purification was achieved by dissolving this material in 100 ml of ethyl acetate, washing the solution four times with a cold, saturated solution of potassium carbonate, drying the solution over sodium sulfate, and evaporating the ethyl acetate. The resulting solid was crystallized from 100 ml of ethanol to give 8.9 g (47 percent overall yield) of N,N'-bis(acetoxymethyl) phenobarbital, m.p. 146°–148°.

The results of pharmacological testing of this compound were as follows:

| | Dosage, mg/kg. |
|---|---|
| Acute Toxicity | |
| $LD_{50}$ (oral) | 640 (474–864) |
| $LD_{50}$ (intraperitoneal) | 550 (437–673) |
| Neurological Deficit | |
| $TD_{50}$ | 140 (110–178) |
| Anticonvulsant Activity | |
| Maximal electroshock, $ED_{50}$ | 28 (22–35) |
| Metrazol, $ED_{50}$ | 104 (80–135) |
| Strychnine, $ED_{50}$ | 120 (90–160) |
| Time of peak activity | 1.5 hours |

EXAMPLE 2

In a 500 ml flask equipped with a stirrer and condenser 11.5 g (0.05 mole) of phenobarbital was dissolved in a mixture of 20 ml dioxane and 100 ml of 37 percent aqueous formaldehyde solution. To this solution 20 mg of sodium carbonate was added and the remainder of the procedure was carried out exactly the same way as described in Example 1 by refluxing, etc., obtaining 6.5 g (34 percent yield) of the same product, m.p. 146°–148° C.

EXAMPLE 3

In a 1,000 ml flask equipped with a stirrer and condenser, 136.4 g (0.536 mole) of phenobarbital sodium powder was suspended in 500 ml of dimethylformamide. The flask was placed in an ice bath. To the cold suspension was added 100 g (1.25 mole) of chloromethyl methyl ether over a period of 1 hour. The resulting suspension was stirred for 2 hours. The crude product was removed by filtration, and washed three times with 100 ml of distilled water, then dissolved in about 500 ml of hot ethanol. To the boiling solution 1 g. of activated carbon was added and the boiling solution was filtered through a Buchner funnel which contained a 1 cm hardly pressed layer of finely divided diatomaceous silica. The cake was washed three times with 25 ml of ethanol and dried in a vacuum desiccator. There were obtained 58 g of N,N'-bis(methoxymethyl) phenobarbital, melting point 115°–117°.

N,N'-Bis(methoxymethyl) phenobarbital (2.0 g) was suspended in 5 ml of acetic anhydride. To the suspension was added 2 drops of stannic chloride. The suspension was stirred for 20 hours, then poured into 20 ml of cold water. The mixture was stirred for 3 hours and the solid removed by filtration. The solid was crystallized from ethanol. Obtained 2.0 g (85 percent yield) of the same product as in Examples 1 and 2.

EXAMPLE 4

5,5-Diphenylhydantoin sodium (27.5 g, 0.1 mole) was suspended in 250 ml of dimethylformamide. To the suspension was added over a period of 30 minutes 8.8 g (8.25 ml) of chloromethyl methyl ether. The resulting suspension was stirred at room temperature overnight, then poured into 1 liter of ice water. A solid material precipitated. The suspension was stirred for 1 hour and the solid was removed by filtration, washed on the filter three times with 100 ml of water and the wet cake was dissolved in 125 ml of ethanol with heating. To the boiling solution of 1 g of activated carbon was added and the boiling solution was filtered through a Buchner funnel containing a 1 cm pressed layer of finely divided diatomaceous silica. The cake was washed three times with 15 ml of ethanol and the hot ethanol solution was diluted with 100 ml of hot water, then allowed to cool to room temperature. The crystals which appeared were filtered and washed three times on the filter with 25 ml of 50 percent aqueous ethanol, then dried in a vacuum desiccator. There were obtained 20 g of 3-methoxymethyl-5,5-diphenylhydantoin; m.p. 127°–128° (yield 67 percent).

3-Methoxymethyl-5,5-diphenylhydantoin (6 g) was suspended in 20 ml of acetic anhydride. To the suspension was added four drops of stannic chloride. The suspension was stirred at room temperature overnight, then poured into 600 ml of ice water, whereupon a solid material precipitated. The suspension was stirred for three hours to decompose the excess of acetic anhydride, then the solid product was removed by filtration and washed on the filter three times with 50 ml of water. The wet product was dissolved in 50 ml of hot ethanol, and to the boiling solution 1 g of activated carbon was added and the solution was filtered through a Buchner funnel which contained a 1 cm pressed layer of diatomaceous silica. The cake was washed three times with 15 ml of hot ethanol; the hot ethanol solution was then diluted with 50 ml of hot water and allowed to cool to room temperature. The resulting crystals were removed by filtration, yielding 6 g of product. This crude product was recrystallized from 60 ml of 80 percent aqueous ethanol to yield 4.7 g of slightly impure product; m.p. 157°–158°. This impure product was further purified by recrystallization from ethanol to yield 2.6 g of pure 3-acetoxymethyl-5,5-diphenylhydantoin; m.p. 162°–163°.

Pharmacological testing showed the compound to have $LD_{50}$ somewhat less than 500 mg/kg. It provided no anticonvulsant activity against Metrazol, but against maximal electroshock it exhibited peak activity approximately 1 hour after dosage, exhibiting an $ED_{50}$ less than 12.5 mg/kg.

EXAMPLE 5

5,5-Diphenylhydantoin (25.2 g, 0.1 mole) was dissolved in a mixture of 25 ml dioxane and 100 ml of water. To the solution 44 ml of 37 percent aqueous formaldehyde solution and 5 ml of triethanolamine was added and the solution was heated at reflux for 7 hours. The hot solution was cooled to room temperature, then acidified with dilute hydrochloric acid to pH 1. The solution was repeatedly extracted with ether and the combined ether solution washed with aqueous sodium chloride solution and dried over sodium sulfate; the ether was evaporated under reduced pressure to yield an oil consisting of 1,3-bis(hydroxymethyl)-5,5-diphenylhydantoin. The oil was acetylated using 25 ml of acetic anhydride and 25 ml of pyridine with which it was allowed to stand at room temperature overnight, then poured into ice water containing 25 ml of concentrated hydrochloric acid. A solid material precipitated. The suspension was stirred for 4 hours to decompose any unreacted acetic anhydride, after which the solid product was removed by filtration, then washed on the filter several times with water. The wet cake was dissolved in methanol (ca. 500 ml) with heating. To the boiling solution 1 g of activated carbon was added and the boiling solution was filtered through a Buchner funnel which contained a 1 cm pressed layer of diatomaceous silica. The cake was washed three times with 25 ml of hot ethanol, and the hot solution was allowed to cool to room temperature. The resulting crystals were filtered, washed three times with 25 ml of methanol and dried in a vacuum desiccator. Obtained 21.2 g of N,N'-bis(acetoxymethyl)-5,5-diphenylhydantoin; m.p. 150°–151° (yield 53.5 percent).

Pharmacological testing of this compound showed the following results:

|  | Dosage, mg/kg. |
|---|---|
| Acute Toxicity | |
| $LD_{50}$ (oral) | 570 (259–1254) |
| Neurological Deficit | |
| $TD_{50}$ | 76 (41–140) |
| Anticonvulsant Activity | |
| Maximal electroshock, $ED_{50}$ | 16.5 (12–22) |
| Time of peak activity | 3 hours |

EXAMPLE 6

Phenobarbital (11.5 g) was dissolved in 20 ml of dioxane. To the solution 100 ml of 37 percent aqueous formaldehyde solution and 1 ml of concentrated hydrochloric acid was added and the reaction mixture was heated at reflux for a period of 20 hours. The mixture was cooled to room temperature and the product was extracted several times with ethyl acetate. The ethyl acetate solutions were combined and washed with water, dried over sodium sulfate and evaporated to dryness. To the oily residue 16 ml of propionic anhydride and 16 ml of pyridine were added and the solution was allowed to stand at room temperature overnight. The solution was then poured into 500 g ice containing 16 ml of concentrated hydrochloric acid and the mixture was stirred for 4 hours, after which the oily product was removed by filtration and dissolved in 100 ml of hot ethanol. To the boiling solution 1 g of activated carbon was added and the hot solution was filtered through a Buchner funnel which contained a compacted layer of finely divided diatomaceous silica.

The cake was washed three times with 10 ml of ethanol and the hot solution together with the washings was allowed to cool to room temperature. The resulting crystals were filtered and recrystallized in the same manner as described for the first crystallization. There was obtained 4 g of N,N′-bis(propionoxymethyl) phenobarbital, m.p. 93.5°–94.5°. When tested as described above, this compound exhibited an $ED_{50}$ against maximal electroshock less than 25 mg/kg. and an $LD_{50}$ (oral) of about 500 mg/kg.

EXAMPLE 7

5,5-Diethylbarbituric acid (barbital) (18.4 g.) was dissolved in 20 ml of dioxane. To the solution 100 ml of 37 percent aqueous formaldehyde solution and 1 ml of 38 percent hydrochloric acid was added, and the solution was heated at reflux for 16 hours. The solution was cooled to room temperature and the product extracted several times with ethyl acetate. The ethyl acetate solutions were combined and washed with water, dried over sodium sulfate, then evaporated to dryness. To the oily residue 20 ml of acetic anhydride and 20 ml of pyridine were added and the solution was allowed to stand at room temperature overnight. The solution was then poured into 500 ml of cold water containing 20 ml of 38 percent hydrochloric acid and the mixture was stirred for 3 hours, after which the oily product was extracted several times with methylene chloride. The methylene chloride solutions were combined and washed with water, dried over sodium sulfate, then evaporated to remove the methylene chloride. From the oily residue the product was isolated by column chromatography using silica gel (grade 950). Elution with a benzene-ethyl acetate mixture (9:1 by volume) provided a semicrystalline product which was crystallized first from hexane, then from pentane. There was obtained pure N,N′-bis(acetoxymethyl) barbital having a melting point of 64°–65° C. When tested as described above, the compound exhibited an $ED_{50}$ against maximal electroshock less than 25 mg/kg., peak activity occurring approximately 2 hours after dosage. Hypnotic activity was very weak, the $ED_{50}$ being 250–300 mg/kg.

What is claimed is:

1. A compound selected from the class consisting of 3-acyloxymethyl 5,5-diphenylhydantoin and N,N′-bis(acyloxymethyl) 5,5-diphenylhydantoin, in which the acyloxy groups are acetoxy, acryloyloxy, methacryloyloxy, propionoxy, or benzoyloxy.

2. 3-Acyloxymethyl 5,5-diphenylhydantoin as claimed in claim 1 in which the acyloxy group is selected from the class consisting of acetoxy, acryloyloxy, methacryloyloxy, propionoxy, and benzoyloxy.

3. The compound as claimed in claim 2 which is 3-acetoxymethyl 5,5-diphenylhydantoin.

4. N,N′-Bis(acyloxymethyl) 5,5-diphenylhydantoin as claimed in claim 1 in which each acyloxy group is selected from the class consisting of acetoxy, acryloyloxy, methacryloyloxy, propionoxy, and benzoyloxy.

5. The compound as claimed in claim 4 which is N,N′-bis(acetoxymethyl) 5,5-diphenylhydantoin.

* * * * *